(12) United States Patent
Simpson et al.

(10) Patent No.: US 7,051,587 B2
(45) Date of Patent: May 30, 2006

(54) TRACTION APPARATUS

(75) Inventors: Neil Andrew Abercrombie Simpson, Aberdeen (GB); Susan D'Arcy, Aberdeen (GB); David Alexander Russell, Edinburgh (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

(21) Appl. No.: 10/838,158

(22) Filed: Apr. 30, 2004

(65) Prior Publication Data

US 2005/0016302 A1    Jan. 27, 2005

Related U.S. Application Data

(60) Provisional application No. 60/466,605, filed on Apr. 30, 2003.

(51) Int. Cl.
*E21B 47/00* (2006.01)

(52) U.S. Cl. .................................. 73/152.54

(58) Field of Classification Search ............. 73/152.54
See application file for complete search history.

(56) References Cited

U.S. PATENT DOCUMENTS

| | | | |
|---|---|---|---|
| 866,544 A | 9/1907 | Walters | |
| 1,758,995 A | 5/1930 | Armstrong et al. | |
| 2,214,982 A | 9/1940 | Wylie | |
| 2,518,330 A | 8/1950 | Jasper et al. | |
| 2,532,566 A * | 12/1950 | Millman | 342/159 |
| 2,539,353 A | 1/1951 | Minyard | |
| 2,668,593 A | 2/1954 | Hay | |
| 3,047,270 A | 7/1962 | Moore, Jr. | |
| 3,056,155 A | 10/1962 | Harmes | |
| 3,144,240 A * | 8/1964 | Connell | 254/134.5 |
| 3,395,759 A * | 8/1968 | Talley, Jr. | 166/155 |
| 3,789,511 A * | 2/1974 | Groom et al. | 33/312 |
| 3,888,319 A | 6/1975 | Boume, Jr. et al. | |
| 3,890,905 A | 6/1975 | Clavin | |
| 3,983,938 A | 10/1976 | Hellums et al. | |
| 4,007,784 A | 2/1977 | Watson et al. | |
| 4,031,750 A | 6/1977 | Youmans et al. | |
| 4,055,315 A | 10/1977 | Gvelesiani et al. | |
| 4,071,086 A | 1/1978 | Bennett | |

(Continued)

FOREIGN PATENT DOCUMENTS

DE    24 05 343 A1    8/1975

(Continued)

OTHER PUBLICATIONS

U.K. Search Report, Application No. GB0409738.2, dated Aug. 13, 2004.

(Continued)

*Primary Examiner*—Hezron Williams
*Assistant Examiner*—John Fitzgerald
(74) *Attorney, Agent, or Firm*—Patterson & Sheridan, L.L.P.

(57) ABSTRACT

The present invention generally relates to a method and apparatus for performing an operation in a tubular. In one aspect, a method comprises positioning an apparatus in the tubular, the apparatus having a tractor portion and an auxiliary module. The method further includes operating the tractor portion to move the apparatus through the tubular and operating the auxiliary module to perform the operation in the tubular. In another aspect, an apparatus for use in a tubular is provided. The apparatus comprises a tractor having a drive member for moving the apparatus in a desired direction, a turbine member adapted to be driven by moving fluid and a conversion member for converting movement of the turbine member to power the drive member. The apparatus further includes an auxiliary module for use in performing an operation in the tubular.

22 Claims, 2 Drawing Sheets

U.S. PATENT DOCUMENTS

| | | |
|---|---|---|
| 4,192,380 A | 3/1980 | Smith |
| 4,243,099 A | 1/1981 | Rodgers, Jr. |
| 4,389,208 A | 6/1983 | LeVeen et al. |
| 4,457,236 A | 7/1984 | Akhmadiev et al. |
| 4,460,920 A | 7/1984 | Weber et al. |
| 4,537,136 A | 8/1985 | Douglas |
| 4,581,938 A | 4/1986 | Wentzell |
| 4,612,986 A | 9/1986 | Fosdick, Jr. et al. |
| 4,624,306 A | 11/1986 | Traver et al. |
| 4,643,377 A | 2/1987 | Christianson |
| 4,648,454 A | 3/1987 | Yarnell |
| 4,676,310 A | 6/1987 | Scherbatskoy et al. |
| 4,705,107 A | 11/1987 | Council et al. |
| 4,747,452 A | 5/1988 | Clark |
| 4,854,384 A | 8/1989 | Campbell |
| 4,919,223 A | 4/1990 | Egger et al. |
| 5,018,451 A | 5/1991 | Hapstack |
| 5,121,694 A | 6/1992 | Zollinger |
| 5,184,676 A | 2/1993 | Graham et al. |
| 5,209,304 A | 5/1993 | Nice |
| 5,309,844 A | 5/1994 | Zollinger |
| 5,375,668 A | 12/1994 | Hallundbaek |
| 5,392,715 A | 2/1995 | Pelrine |
| 5,419,397 A | 5/1995 | Reynolds et al. |
| 5,625,917 A | 5/1997 | Hawkins |
| 5,649,603 A * | 7/1997 | Simpson et al. ............ 175/323 |
| 5,794,703 A | 8/1998 | Newman et al. |
| 5,954,131 A | 9/1999 | Sallwasser |
| 6,082,461 A | 7/2000 | Newman et al. |
| 6,089,323 A | 7/2000 | Newman et al. |
| 6,173,787 B1 | 1/2001 | Wittrisch |
| 6,179,055 B1 | 1/2001 | Sallwasser et al. |
| 6,179,058 B1 * | 1/2001 | Wittrisch .................... 166/384 |
| 6,182,765 B1 * | 2/2001 | Kilgore ...................... 166/381 |
| 6,273,189 B1 | 8/2001 | Gissler et al. |
| 6,345,669 B1 | 2/2002 | Buyers et al. |
| 6,347,674 B1 | 2/2002 | Bloom et al. |
| 6,431,270 B1 | 8/2002 | Angle |
| 6,454,011 B1 | 9/2002 | Schempf et al. |
| 6,464,003 B1 | 10/2002 | Bloom |
| 6,598,678 B1 * | 7/2003 | Simpson et al. ............ 166/297 |
| 6,640,616 B1 | 11/2003 | Holt |
| 6,679,341 B1 | 1/2004 | Bloom et al. |
| 6,722,442 B1 * | 4/2004 | Simpson ..................... 166/381 |
| 6,745,839 B1 | 6/2004 | Simpson |
| 2002/0112859 A1 | 8/2002 | Bloom et al. |
| 2002/0124640 A1 * | 9/2002 | Brewer .................... 73/152.49 |
| 2004/0045474 A1 | 3/2004 | Simpson |

FOREIGN PATENT DOCUMENTS

| | | |
|---|---|---|
| DE | 33 11 094 A1 | 9/1984 |
| EP | 0 390 352 A2 | 10/1990 |
| EP | 0 514 039 A1 | 11/1992 |
| EP | 0 523 880 A1 | 1/1993 |
| EP | 0 526 900 A1 | 2/1993 |
| EP | 1442278 | 4/2003 |
| FR | 2 355 236 | 9/1978 |
| FR | 2 495 191 | 6/1982 |
| FR | 2 667519 A1 | 4/1992 |
| GB | 614 592 | 12/1948 |
| GB | 1 124 732 | 8/1968 |
| GB | 1 418 492 | 12/1975 |
| GB | 2020023 A * | 11/1979 |
| GB | 2 305 407 A | 4/1997 |
| GB | 2 334 280 | 2/1998 |
| GB | 2 331 347 A | 5/1999 |
| GB | 2 351 304 | 12/2000 |
| GB | 2 356 439 A | 5/2001 |
| GB | 2380755 A * | 4/2003 |
| JP | WO 9708418 A1 * | 3/1997 |
| WO | WO 86/01751 A1 | 3/1986 |
| WO | WO 93/18277 | 9/1993 |
| WO | WO 93/24728 A1 | 12/1993 |
| WO | WO 94/08728 A1 | 4/1994 |
| WO | WO 98/06927 | 2/1998 |
| WO | WO 99/36724 A1 | 7/1999 |
| WO | WO 00/57100 | 9/2000 |
| WO | WO 00/63606 A1 | 10/2000 |
| WO | WO 00/73619 | 12/2000 |
| WO | WO 01/18351 | 3/2001 |
| WO | WO 02/044509 | 6/2002 |
| WO | WO 03/078887 | 9/2003 |

OTHER PUBLICATIONS

PCT International Search Report dated Feb. 20, 2002, for Application No. PCT/GB01/05150.

PCT International Search Report dated Jul. 31, 2003 based on PCT/EP03/50065.

UK Office Action, Application No. GB 04/20363.4, dated Nov. 26, 2004.

International Search Report from the European Patent Office for International Appl. No. PCT/GB00/01360, dated Jul. 28, 2000.

PCT International Search Report from PCT/GB 00/02053, Dated Aug. 22, 2000.

International Search Report Dated Nov. 9, 2000, for Application Ser. No. PCT/GB00/03385.

* cited by examiner

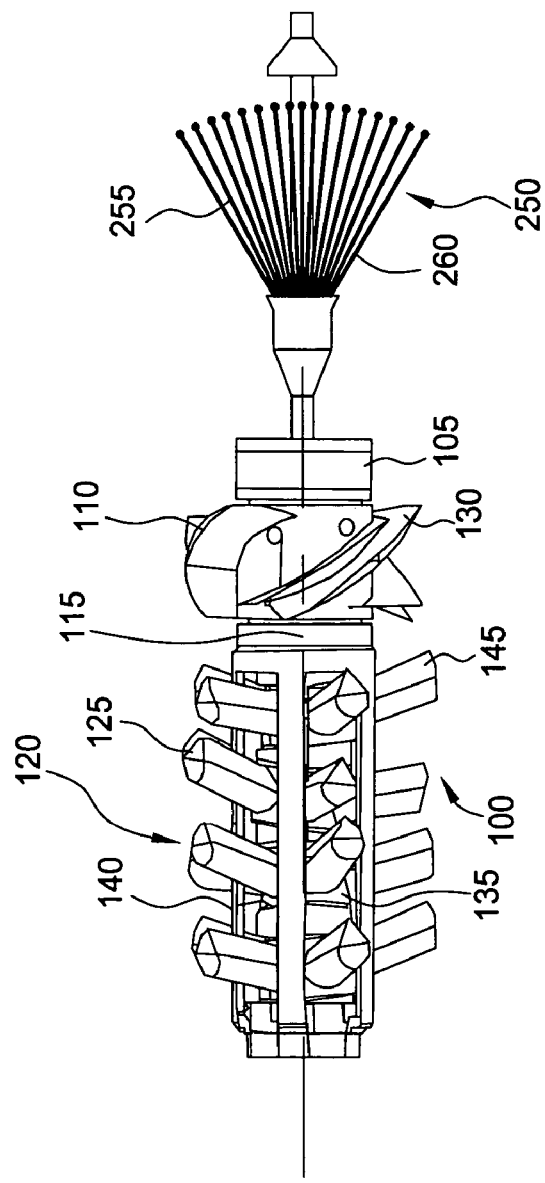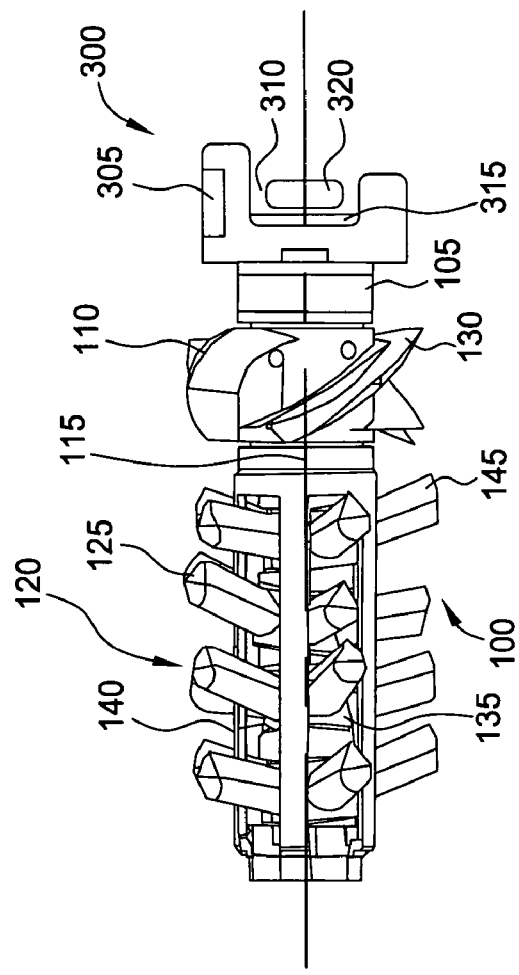

TRACTION APPARATUS

CROSS-REFERENCE TO RELATED APPLICATIONS

This application claims benefit of U.S. Provisional patent application Ser. No. 60/466,605, filed Apr. 30, 2003, which application is herein incorporated by reference in its entirety.

BACKGROUND OF THE INVENTION

1. Field of the Invention

Embodiments of the present invention generally relate to a completion operation. More particularly, the present invention relates to a method and an apparatus for transporting a tool into a tubular and performing an operation.

2. Description of the Related Art

The safe and continuous operation of hydrocarbon wellbores and pipeline networks is essential to the operators and users of such networks. Accordingly, such pipeline and wellbores are cleaned and inspected at regular intervals to ensure their operational integrity.

The conventional approach to inspection of operating pipelines is for the tubular string to be precleaned several times using a "dumb" pig. The dumb pig, without any on-board intelligence, typically operates to scrape and remove debris such as wax, scale, sand, and other foreign matter from the tubular. In a newly formed pipeline with a new tubular string, the step of precleaning may not be required. In either case, a detailed inspection is subsequently performed by a "smart" pig, which makes detailed measurements of the tubular string to determine the internal condition of the tubular. The smart pig may also be employed to transport a tool to a predetermined location in the tubular string to perform various operations therein. The smart pig is typically equipped with technologies of varying sophistication. For example, the smart pig may include a mechanism for measuring an interior surface of the tubular string. In another example, the smart pig may include techniques such as magnetic flux leakage (MFL) or ultrasonic scanning (at various positions along the tubular string) to detect flaws or defects, which might prejudice the tubular's integrity. In other examples, the smart pig may include complex tools generally comprising arrays of probes and sensors for placement of on-line monitoring equipment for later collection or for precise placement of isolation components and radioactive devices.

One shortcoming of conventional pigging inspection operations is that a complicated technique is typically required to position the smart pig at a predetermined location in the tubular string prior to the inspection of the tubular string. For example, one technique requires reversing the flow of fluid in the tubular string to direct the smart pig in the desired direction. This manipulation of the fluid flow may cause numerous problems such as storage problems and production problems. Another technique requires additional components to be constructed adjacent to the tubular string such as a sub-sea pig facility or a second line. These components are used to introduce the smart pig to the predetermined location in the tubular string so that the smart pig can conduct an inspection of the tubular string as it returns to the platform with the flow of fluid in the tubular string. For instance, the second line is constructed adjacent to the tubular string to provide a fluid pathway to pump the smart pig from the platform to the predetermined point in the tubular string. However, these additional components increase the cost of the conventional pigging inspection operation and add undesirable complexity the completion operation.

In a similar manner, a cleaning apparatus or an inspection apparatus may be employed in a wellbore by urging the cleaning apparatus or the inspection apparatus through the wellbore on a string member. However, this technique increases the cost of the wellbore operation.

More recently, an apparatus commonly known as a tractor has been developed that is capable of entering a tubular string at a predetermined point of the tubular string and traveling through the tubular string. The tractor subsequently returns through the same tubular string back to the predetermined point. However, the tractor has not been effectively utilized in conjunction with a pig or other inspection or cleaning tools requiring transportation through a tubular string.

A need therefore exists for a method and apparatus of using a tractor in conjunction with other tools to transport and/or place tools in a pipeline or a wellbore.

SUMMARY OF THE INVENTION

The present invention generally relates to a method and apparatus for performing an operation in a tubular string. In one aspect, a method comprises positioning an apparatus in the tubular, the apparatus having a tractor portion and an auxiliary module. The method further includes operating the tractor portion to move the apparatus through the tubular and operating the auxiliary module to perform the operation in the tubular.

In another aspect, an apparatus for use in a tubular is provided. The apparatus comprises a tractor having a drive member for moving the apparatus in a desired direction, a turbine member adapted to be driven by moving fluid and a conversion member for converting movement of the turbine member to power the drive member. The apparatus further includes an auxiliary module for use in performing an operation in the tubular.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a sectional view illustrating the traction apparatus with a tubular wall surface inspection module.

FIG. 4 is a sectional view illustrating the traction apparatus with a component placement module.

DETAILED DESCRIPTION OF THE PREFERRED EMBODIMENT

In general, the present invention relates to an apparatus for, and method of, performing an operation by utilizing a tractor to transport an auxiliary module into a tubular. The tractor is an apparatus that is arranged to be driven in the either direction as the fluid in the tubular, but is preferably arranged to be driven in the opposite direction to the fluid flow, that is upstream or against the flow. The tractor is employed for transporting the auxiliary module capable of performing an operation such as detecting a physical condition in the tubular by obtaining data along the entire length of the tubular string, wherein the data is representative of the physical condition. As herein defined, the term "tubular" may refer to a casing for use in a wellbore, a pipe for use in a pipeline or any other type of tubular used in the oil and gas industry. Furthermore, the term "auxiliary module" is defined as any component used to perform an operation in a tubular. To better understand the novelty of the apparatus of the present invention and the methods of use thereof, reference is hereafter made to the accompanying drawings.

Figure 1:
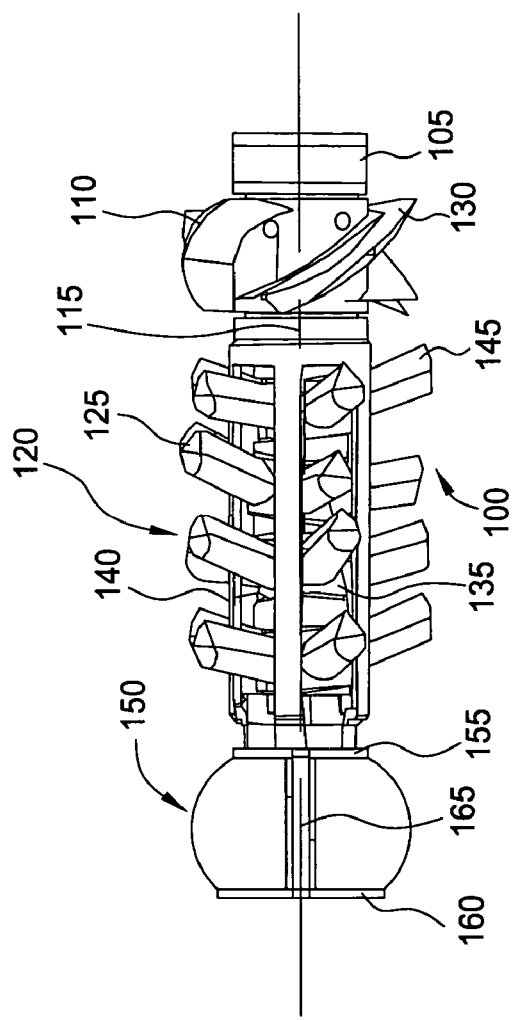
FIG. 1 is a sectional view illustrating a traction apparatus with a wax cutting module in accordance with the present invention.

FIG. 1 is a sectional view illustrating a traction apparatus 100 with a wax cutting module 150 in accordance with the present invention. Herein, the components of the apparatus 100 will be described generally as it relates to the present invention. The components are described in greater detail in U.S. Pat. No. 6,722,442, issued to Simpson on Apr. 20, 2004, entitled SUBSURFACE APPARATUS and U.S. Patent Application Publication 2004/0045474, published on Mar. 11, 2004, entitled BI-DIRECTIONAL TRACTION APPARATUS, both of which are herein incorporated by reference in their entirety.

The apparatus 100 includes a generally cylindrical body 105 upon which is mounted a rotatable member 110. The rotatable member 110 is typically a turbine rotor having a number of generally helical blades 130. The rotatable member 110 is operatively attached to a central drive shaft (not shown) via a conversion member 115 such as a gear box. The central drive shaft provides power to a drive member 120. Generally, the drive member 120 comprises a plurality of leg members 125.

The leg members 125 each comprise a cam 135 mounted on the drive shaft and six elastomer or compression fingers 145 which are oscillated or swashed backwards and forwards by the rotation of the drive shaft. As described in U.S. Pat. No. 6,722,442, the cams 135 are offset to vary the traction provided by each leg member 125 such that rotation of the drive shaft will cause the apparatus 100 to move through a tubular (not shown) contacted by the ends of the fingers 145. The fingers 145 are mounted on the respective cams 135 via bearings 140 and by moving the fingers 145 from one side of the bearing center line to the other it is possible to reverse the direction of traction and to facilitate movement of the apparatus 100 in the opposite direction to the original drive direction.

It is within the scope of the present invention to capture and use the excess power generated by the rotatable member 110 in the apparatus 100 to power the auxiliary module, such as the wax cutting module 150. This may be accomplished by capturing the energy either mechanically, hydraulically, or electrically directly from the conversion member 115. Additionally, the rotation of the drive shaft could be used to rotate a sensor for inspection purposes.

The wax cutting module 150 is adapted to fit at the front end of the apparatus 100 for use in breaking up wax and other deposits from a wall of the tubular. The wax cutting module 150 is operatively attached to the drive shaft through a gear box (not shown) to provide an appropriate rotational speed. Typically, the wax cutting module 150 includes two cutting blades (not shown) mounted within respective rings 155, 160. The wax cutting module 150 also includes a set of axially and radially extending blades 165 between the two rings 155, 160.

In operation, the wax cutting module 150 is rotated and urged through the tubular by the apparatus 100 to break up wax and other deposits on the inner surface of the tubular. Upon dislodging the wax and other deposits such as scale or asphaltene, the deposits are washed past the apparatus 100 and subsequently out of the tubular by flowing fluid in the opposite direction to the directional movement of the apparatus 100. In another embodiment, brush members (not shown) may be attached to an outer surface of several fingers 145. As the apparatus 100 moves through the tubular, the brush members are oscillated or swashed backwards and forwards along with fingers 145 to break up wax and other deposits on the inner surface of the tubular. As set forth above, the deposits are then washed past the apparatus 100 by flowing fluid in the opposite direction to the directional movement of the apparatus 100.

Figure 2:
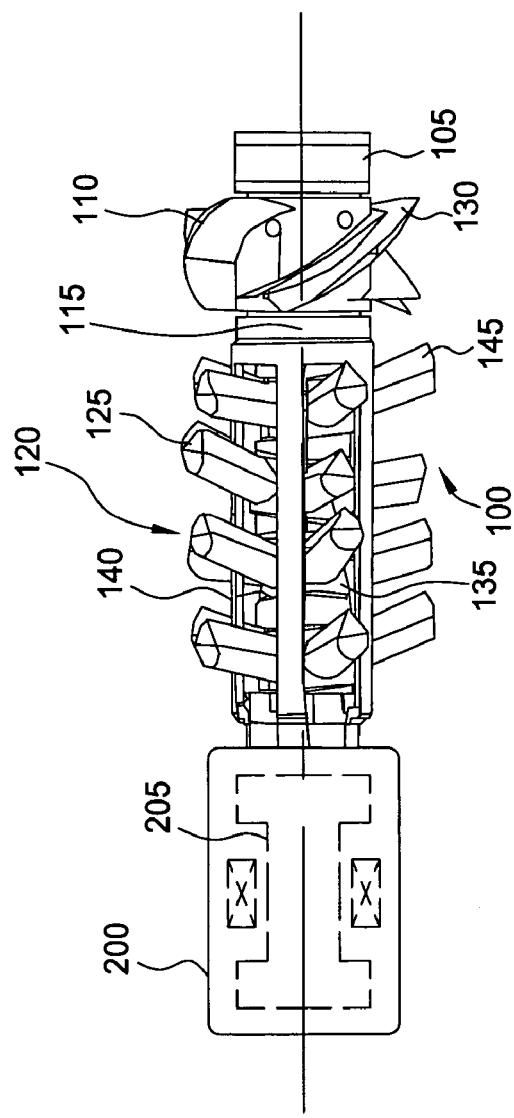
FIG. 2 is a sectional view illustrating the traction apparatus with a tubular wall thickness inspection module.

FIG. 2 is a sectional view illustrating the traction apparatus 100 with a tubular wall thickness inspection module 200. In a similar manner as set forth above, the tubular wall thickness inspection module 200 is transported through the tubular attached to the apparatus 100.

The tubular wall thickness inspection module 200 is adapted to fit at the front end of the apparatus 100 for use in measuring the thickness of the tubular using an electromagnetic technique. The result is presented as a type of tubular-inspection log, giving an estimate of metal loss and detecting corrosion. In operation, a coil 205 centered inside the tubular generates an alternating magnetic field. Another coil (not shown) measures the phase shift introduced by the tubular. This phase shift depends on the tubular-wall thickness and internal diameter, as well as the tubular conductivity and magnetic permeability. The effects change at different frequencies, so that by varying the frequency, the thickness and internal diameter can be uniquely determined. It should be noted that an array of electromagnetic members may employed with the apparatus 100 without departing from principles of the present invention. An example of a magnet assembly for pipeline inspection equipment is described in GB 1510225 and GB 1535252, both of which are herein incorporated by reference in their entirety. Electromagnetic thickness can also be measured using other techniques such as a tubular-potential profile or a flux-leakage measurement.

In another embodiment, an ultrasonic caliper (not shown) may be employed in the tubular wall thickness inspection module 200. The ultrasonic caliper is a device for measuring the internal diameter of the tubular using high-frequency acoustic signals. In operation, a transducer (not shown) emits a high-frequency pulse that is reflected by the tubular wall back to the transducer. The diameter is determined from the time of flight of this echo and the fluid acoustic velocity. The transducer is rotated to produce a cross section of the tubular size and full-coverage images of the tubular wall. The measurement has high resolution and is used to detect deformations, the buildup of scale, or metal loss due to corrosion. The amplitude of the echo from the inner tubular surface provides qualitative information on the state of the surface, such as corrosion. Tubular thickness may also be measured simultaneously, either by analysis of the tubular resonance signal or by detecting separately the echoes from the inner and outer tubular surfaces. It should be noted that an array of ultrasonic calipers may employed with the apparatus 100 without departing from principles of the present invention.

FIG. 3 is a sectional view illustrating the traction apparatus 100 with a tubular wall surface inspection module 250. In a similar manner as set forth above, the surface inspection module 250 is transported through the tubular attached to the apparatus 100.

As illustrated, the wall surface inspection module 250 is adapted to fit at a back end of the apparatus 100 for use in measuring the interior surface of the tubular string using a multifinger caliper 255 having a plurality of arms 260. By using a large number of arms 260 or fingers, the caliper 255 can detect small changes in the wall of the tubular. The main purpose of the measurement is to detect deformations, the buildup of scale, or metal loss due to corrosion. In operation, the wall surface inspection module 250 is urged through the tubular by the apparatus 100 to measure the interior surface of the tubular. Upon contact with a deformation in the tubular, the arms 260 move radially and subsequently send a signal to a memory storage unit (not shown) in the surface inspection module 250 for later use in profiling the interior surface of the tubular.

In another embodiment, an inspection camera (not shown) may be employed in the tubular wall surface inspection module 250. The camera is appropriately positioned to take pictures of the interior surface of the tubular as the apparatus 100 moves therethrough. The camera may also be rotated to capture full coverage images of the interior surface of the tubular by operatively attaching the camera to the drive shaft via a gear box (not shown) to provide an appropriate rotational speed.

FIG. 4 is a sectional view illustrating the traction apparatus 100 with a component placement module 300. In a similar manner as set forth above, the component placement module 300 is transported through the tubular attached to the apparatus 100.

As illustrated, the component placement module 300 is adapted to fit at a back end of the apparatus 100 for use in the placement of components 320 in the tubular. The components 320 may be used for acquiring data representative of characteristics of contents of the tubular at predetermined locations in the tubular. The components 320 may also be used for acquiring data about the other characteristics of the tubular, such as temperature and pressure. It should be understood, however, that the component placement module 300 may be located at any position on the apparatus 100, without departing from principles of the present invention.

The component placement module 300 typically includes a sensor 305, such as an odometer, for determining the distance traveled by the apparatus 100 in the tubular. The component placement module 300 further includes a chamber 310 for housing the components 320. The chamber 310 includes an ejection device 315 for ejecting the components 320 at the predetermined location in the tubular. An example of a method and an apparatus for monitoring conditions in pipelines is described in WO 02/16908, which is herein incorporated by reference in its entirety.

In operation, the component placement module 300 is urged through the tubular by the apparatus 100 to place the components 320 in the tubular. As the apparatus 100 and the component placement module 300 approach a predetermined location in the tubular, the sensor 305 sends a signal to the ejection device 315 to release one of the components 320 from the chamber 310. After the component 320 is placed in the tubular, the apparatus 100 and placement module 300 both travel through the tubular to the next predetermined location and the ejection procedure is repeated until each component 320 is positioned in the tubular. Thereafter, the components 320 collect data for a predetermined period of time and then may be collected to obtain the data or the data is read by an external device (not shown).

In another embodiment, the component placement module 300 and apparatus 100 may be adapted to transport and place an isolation member (not shown) at a predetermined location in the tubular. The isolation member may be released in a similar manner as discussed above by using the sensor 305 to determine the predetermined location and using the ejection device 315 to release and activate the isolation member. Thereafter, a portion of the tubular is isolated from another portion of the tubular.

In another embodiment, the component placement module 300 and apparatus 100 may be adapted to transport and place a member (not shown) having a detectable source of signals, such as a tracker or location tool, at a predetermined location in the tubular. The member typically emits acoustic or radio signals. The member may be released in a similar manner as discussed above by using the sensor 305 to determine the predetermined location and using the ejection device 315 to release and activate the member.

In another embodiment, a sampling module (not shown) may be adapted to fit on the apparatus 100 for sampling product or contaminant, such as water at tubular low points. In a similar manner as set forth above, the sampling module is transported through the tubular attached to the apparatus 100. Preferably, the sampling module includes a timer or a sensor that sends a signal to open the container at a predetermined location in the tubular and then close the container after it fills with product or contaminant. Thereafter, the apparatus 100 returns the sampling module back to the surface of the tubular or to another predetermined location.

While the foregoing is directed to embodiments of the present invention, other and further embodiments of the invention may be devised without departing from the basic scope thereof, and the scope thereof is determined by the claims that follow.

The invention claimed is:

1. A method for performing an operation in a tubular, the method comprising:
    positioning an apparatus in a moving fluid stream in the tubular, the apparatus having a tractor and a component placement module;
    operating the tractor to move the apparatus through the tubular utilizing the moving fluid stream in the tubular; and
    releasing a component at a predetermined location in the tubular by employing an ejection device constructed and arranged to be substantially powered by the moving fluid stream in the tubular.

2. The method of claim 1, wherein the tractor includes:
    a drive member for moving the apparatus in a desired direction;
    a turbine member adapted to be driven by moving fluid; and
    a conversion member for converting movement of the turbine member to power the drive member.

3. The method of claim 1, further including measuring the distance traveled by the apparatus in the tubular.

4. The method of claim 1, further including acquiring data representative of characteristics of contents of the tubular at the predetermined location by utilizing the component.

5. The method of claim 1, further including isolating a portion of the tubular from another portion of the tubular by activating an isolation member in the component.

6. The method of claim 1, further including operating an auxiliary module on the tractor to perform a second operation in the wellbore.

7. The method of claim 6, wherein the auxiliary module is a tubular inspection module for use in measuring a characteristic of the tubular.

8. The method of claim 7, further including generating an alternating magnetic field from the inspection module and measuring the phase shift to determine the wall thickness.

9. The method of claim 7, further including emitting a high frequency pulse from a transducer in the inspection module that is reflected by the tubular back to the transducer to determine the wall thickness.

10. The method of claim 7, further including extending a plurality of fingers in the inspection module to determine an interior surface of the tubular.

11. The method of claim 7, further including creating images of an interior surface of the tubular by a camera in the inspection module.

12. The method of claim 11, further including rotating the inspection module to capture full coverage images of the interior surface of the tubular.

13. The method of claim 6, wherein the auxiliary module is a sampling module.

14. The method of claim 13, further including activating a sampling mechanism in the sampling module at a predetermined point in the tubular to obtain a sample of fluid.

15. The method of claim 6, wherein the auxiliary module is a debris removal module for use in removing debris from an inner diameter of the tubular.

16. The method of claim 15, further including rotating the debris removal module.

17. The method of claim 16, wherein the debris removal module is a rotatable cutter.

18. The method of claim 15, further including oscillating the debris removal module.

19. The method of claim 18, wherein the debris removal module is a brush member operatively attached to a drive member of the tractor.

20. An apparatus for use in a tubular, comprising:
   a tractor having:
      a drive member for moving the apparatus in a desired direction;
      a turbine member adapted to be driven by moving fluid in the tubular; and
      a conversion member for converting movement of the turbine member to power the drive member;
   an auxiliary module for use in performing an operation in the tubular; and
   a component placement module having a selectively activated ejection device constructed and arranged to be substantially powered by moving fluid in the tubular.

21. The assembly of claim 20, wherein the auxiliary module is a tubular wall thickness inspection module.

22. The assembly of claim 20, wherein the auxiliary module is a tubular wall surface inspection module.

* * * * *